United States Patent
Kudo et al.

(10) Patent No.: US 7,659,996 B2
(45) Date of Patent: Feb. 9, 2010

(54) RELATIVE POSITION DETECTION DEVICE AND DETECTOR FOR ROTARY BODY AND IMAGE FORMING APPARATUS INCLUDING THE RELATIVE POSITION DETECTION DEVICE

(75) Inventors: Koichi Kudo, Kanagawa-ken (JP); Hideyuki Takayama, Kanagawa-ken (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 11/979,749

(22) Filed: Nov. 8, 2007

(65) Prior Publication Data

US 2008/0106747 A1    May 8, 2008

(30) Foreign Application Priority Data

Nov. 8, 2006   (JP)   ............................. 2006-303365
Oct. 2, 2007   (JP)   ............................. 2007-259258

(51) Int. Cl.
  G01B 11/14   (2006.01)
  G01D 5/34    (2006.01)
  G01N 21/86   (2006.01)

(52) U.S. Cl. .................. 356/616; 356/614; 250/231.13; 250/559.29

(58) Field of Classification Search ........................ None
See application file for complete search history.

(56) References Cited

U.S. PATENT DOCUMENTS

| | | | | |
|---|---|---|---|---|
| 3,454,777 A * | 7/1969 | Marcus | ................... | 250/237 R |
| 4,079,252 A * | 3/1978 | Brake | ..................... | 250/237 G |
| 5,572,019 A * | 11/1996 | Sakuma | ................. | 250/231.16 |
| 5,575,575 A * | 11/1996 | Ide et al. | ..................... | 400/185 |
| 5,748,373 A * | 5/1998 | Hane et al. | .................. | 359/575 |
| 5,837,999 A * | 11/1998 | Horiuchi | ................. | 250/231.14 |
| 6,058,224 A * | 5/2000 | Haga | ........................... | 382/313 |
| 6,624,407 B1 * | 9/2003 | Aboonasry et al. | ...... | 250/231.14 |
| 6,635,863 B1 * | 10/2003 | Nihommori et al. | ..... | 250/231.13 |
| 6,642,509 B2 * | 11/2003 | Miyata | ................... | 250/231.13 |
| 7,307,736 B2 * | 12/2007 | Tobiason et al. | ............ | 356/614 |
| 7,324,212 B2 * | 1/2008 | Mitchell et al. | ............. | 356/499 |
| 7,385,179 B2 * | 6/2008 | Igaki et al. | ............. | 250/231.14 |
| 2004/0022557 A1 * | 2/2004 | Kudo | .......................... | 399/167 |
| 2005/0072911 A1 * | 4/2005 | Kuroda et al. | .......... | 250/231.13 |

(Continued)

FOREIGN PATENT DOCUMENTS

JP    01-287725    11/1989

(Continued)

*Primary Examiner*—Gregory J Toatley, Jr.
*Assistant Examiner*—Gordon J Stock, Jr.
(74) *Attorney, Agent, or Firm*—Harness, Dickey & Pierce

(57) ABSTRACT

This patent specification describes a relative position detection device and a detector for a rotary body and an image forming apparatus including the relative position detection device. The relative position detection device includes a scale comprising a pattern continuously formed by changing reflectance or transmittance and moving in a direction, a light source to irradiate the scale, a light receiving unit to read the pattern and output a signal, and a signal processing unit to process the output signal of the light receiving unit. The pattern is formed by a line pattern having regularly spaced lines perpendicular to the direction of movement of the scale, the light receiving unit is slanted with respect to the lines, and the relative position detection device detects a relative position change and speed change of the scale.

12 Claims, 17 Drawing Sheets

U.S. PATENT DOCUMENTS

| | | |
|---|---|---|
| 2006/0116228 A1 | 6/2006 | Kamiya et al. |
| 2007/0086679 A1 | 4/2007 | Kudo et al. |
| 2007/0108376 A1 | 5/2007 | Kudo et al. |

FOREIGN PATENT DOCUMENTS

| | | |
|---|---|---|
| JP | 09-175687 | 7/1997 |
| JP | 10-281811 | 10/1998 |
| JP | 11-024507 | 1/1999 |
| JP | 2003-076486 | 3/2003 |
| JP | 2003-222504 | 8/2003 |
| JP | 2003-222505 | 8/2003 |
| JP | 2004-117010 | 4/2004 |
| JP | 2004-205308 | 7/2004 |
| JP | 2006-160512 | 6/2006 |

* cited by examiner

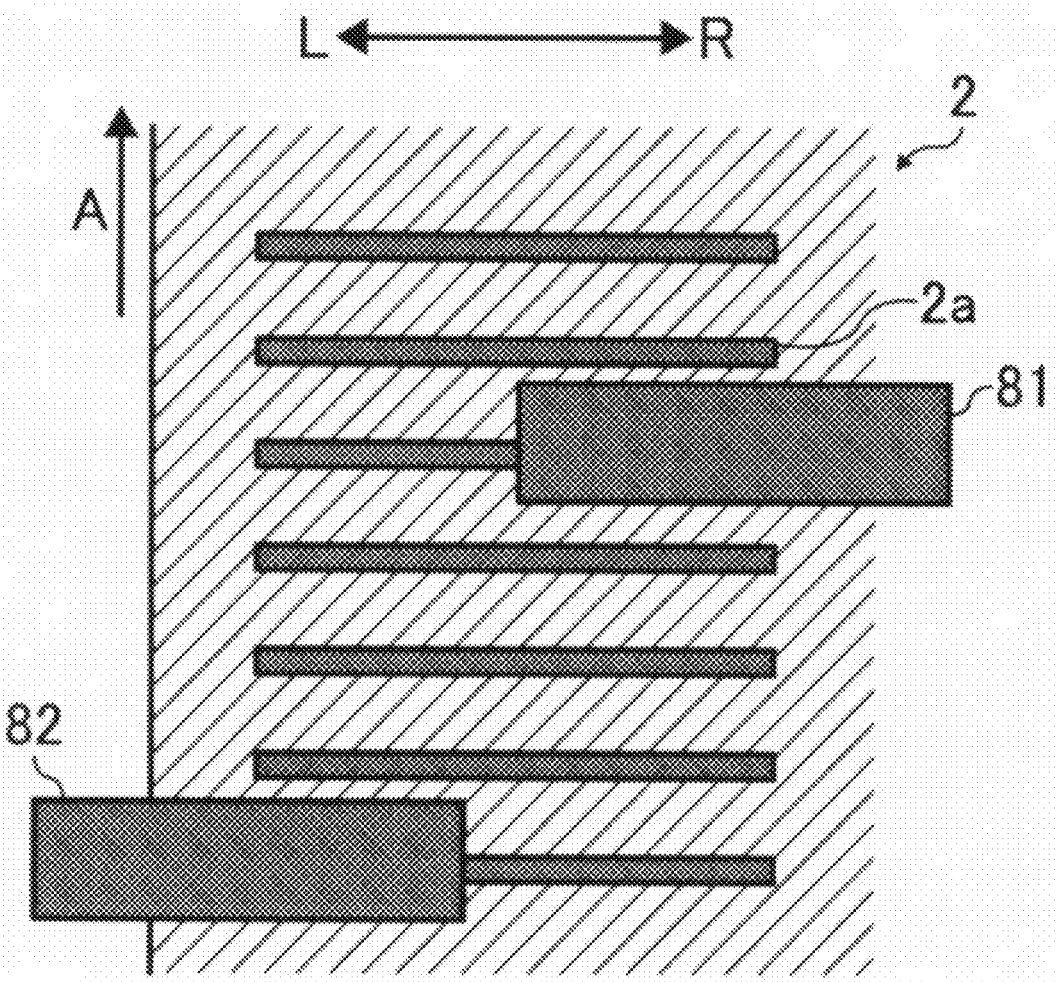

RELATIVE POSITION DETECTION DEVICE AND DETECTOR FOR ROTARY BODY AND IMAGE FORMING APPARATUS INCLUDING THE RELATIVE POSITION DETECTION DEVICE

CROSS-REFERENCE TO RELATED APPLICATION

This patent specification is based on and claims priority from Japanese Patent Applications No. 2006-303365 filed on Nov. 8, 2006 and No. 2007-259258 filed on Oct. 2, 2007 in the Japan Patent Office, the entire contents of which are incorporated by reference herein.

BACKGROUND

1. Field

This patent specification relates to a relative position detection device and a detector for a rotary body and an image forming apparatus including the relative position detection device.

2. Description of the Related Art

Various techniques of displacement measurement using image sensors have been proposed and used in displacement measurement devices and optical mouse devices.

In a conventional displacement measurement device, data of an image captured by an image sensor is compared to previously captured image data to calculate a moved position of the image. For example, the previously captured image is shifted one pixel by one pixel to calculate the autocorrelation between the currently captured image and the previously captured image. The position having the highest correlation coefficient is recognized as the current position of the image.

Such a displacement measurement method is convenient because, unlike a common encoder, a detector can independently measure displacement from the image pattern of a detected surface without the use of a reference scale. In addition, compared with an encoder using a scale in which data is updated by incrementing on a signal edge, position data is updated for each sample, which leads to reduction in time and improves real-time capability.

However, the above-described technique has the following difficulties: (1) position detection using correlation between images requires calculation of correlation coefficients for every pixel, and thus the number of calculations is large and real-time measurement is difficult; (2) to obtain a cumulative travel distance, each relative travel distance obtained by each sample is added, and thus measurement errors accumulate through the calculation. Furthermore, to perform higher accuracy position measurement, a larger number of pixels are used, which increases the number of calculations.

In the case of a conventional rotary encoder using images of inclined lines that traverse a line sensor in the longitudinal direction of the line sensor in accordance with the rotation of a disk, the angle of the rotation of the disk is detected by the resolution power based on pixel unit of the line sensor. Therefore, even a line sensor having a large pixel pitch detects the rotation at a higher resolution. The disk also has a circular pattern that is formed in the direction of rotation of the disk. The line sensor reads the circular pattern on the disk to detect and correct displacement of the center of the disk. Consequently, movement in the direction of this displacement is not detected as movement in the direction of rotation of the disk.

SUMMARY

This patent specification describes at least one example embodiment of a relative position detection device that includes a scale comprising a pattern continuously formed by changing reflectance or transmittance and moving in a direction, a light source to irradiate the scale, a light receiving unit to read the pattern and output a signal, and a signal processing unit to process the output signal of the light receiving unit. The pattern is formed by a line pattern having regularly spaced lines perpendicular to the direction of movement of the scale, the light receiving unit is slanted with respect to the lines, and the relative position detection device detects a relative position change and speed change of the scale.

This patent specification further describes at least one example embodiment of a relative position detection device that includes a scale comprising a pattern continuously formed by changing reflectance or transmittance and moving in a direction, a light source to irradiate the scale, a light receiving unit to read the pattern and output a signal, and a signal processing unit to process the output signal of the light receiving unit. The pattern is formed by a pattern having regularly spaced marks perpendicular to the direction of movement of the scale, the light receiving unit comprises a plurality of light receiving areas that are disposed to perform detection at positions that are displaced from each other in the direction of movement of the scale and the direction perpendicular thereto, and the relative position detection device detects a relative position change and speed change of the scale.

The patent specification further describes at least one example embodiment of a detector for a rotary body that includes the relative position detection device, a drive unit configured to drive the rotary body, and a control unit configured to control the drive unit based on a position and a speed of the rotary body output from the relative position detection device.

The patent specification further describes at least one example embodiment of an image forming apparatus comprising the relative position detection device.

BRIEF DESCRIPTION OF THE DRAWINGS

A more complete appreciation of the disclosure and many of the attendant advantages thereof will be readily obtained as the same becomes better understood by reference to the following detailed description of example embodiments when considered in connection with the accompanying drawings, wherein:

FIG. 16 is a diagram illustrating an example arrangement of optical marks on a scale and light receiving elements in a relative position detection device according to at least one example embodiment;

DETAILED DESCRIPTION OF EXAMPLE EMBODIMENTS

Figure 1:
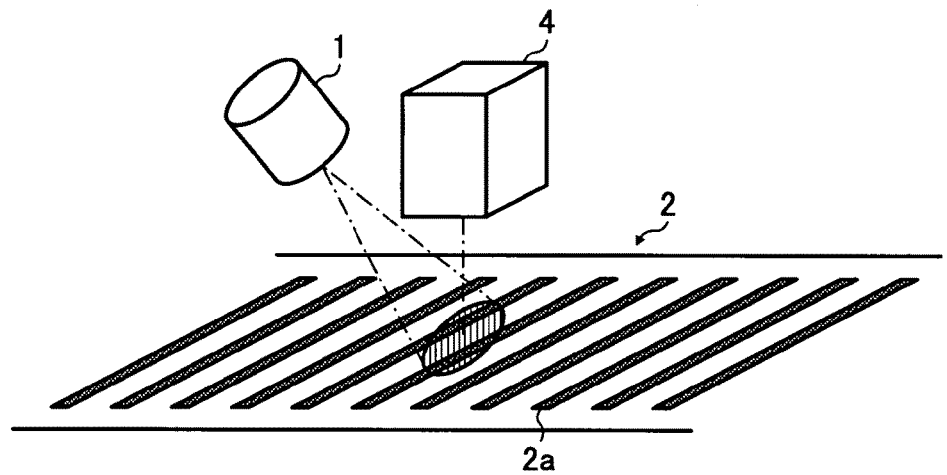
FIG. 1 is a schematic perspective diagram illustrating a configuration of a relative position detection device according to at least one example embodiment.

In describing example embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner.

Figure 6:
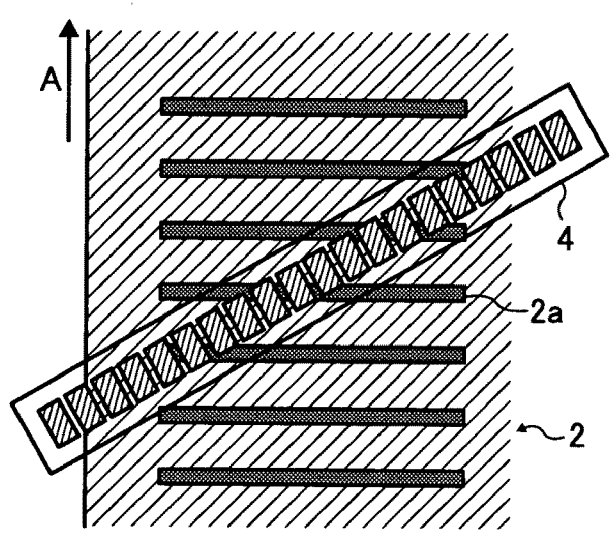
FIG. 6 is a diagram illustrating an example arrangement of a line sensor in the relative position detection device according to at least one example embodiment.

Referring now to the drawings, wherein like reference numerals designate identical or corresponding parts throughout the several views thereof, particularly to FIG. 6, relative position detection devices according to example embodiments are described.

Figure 2:
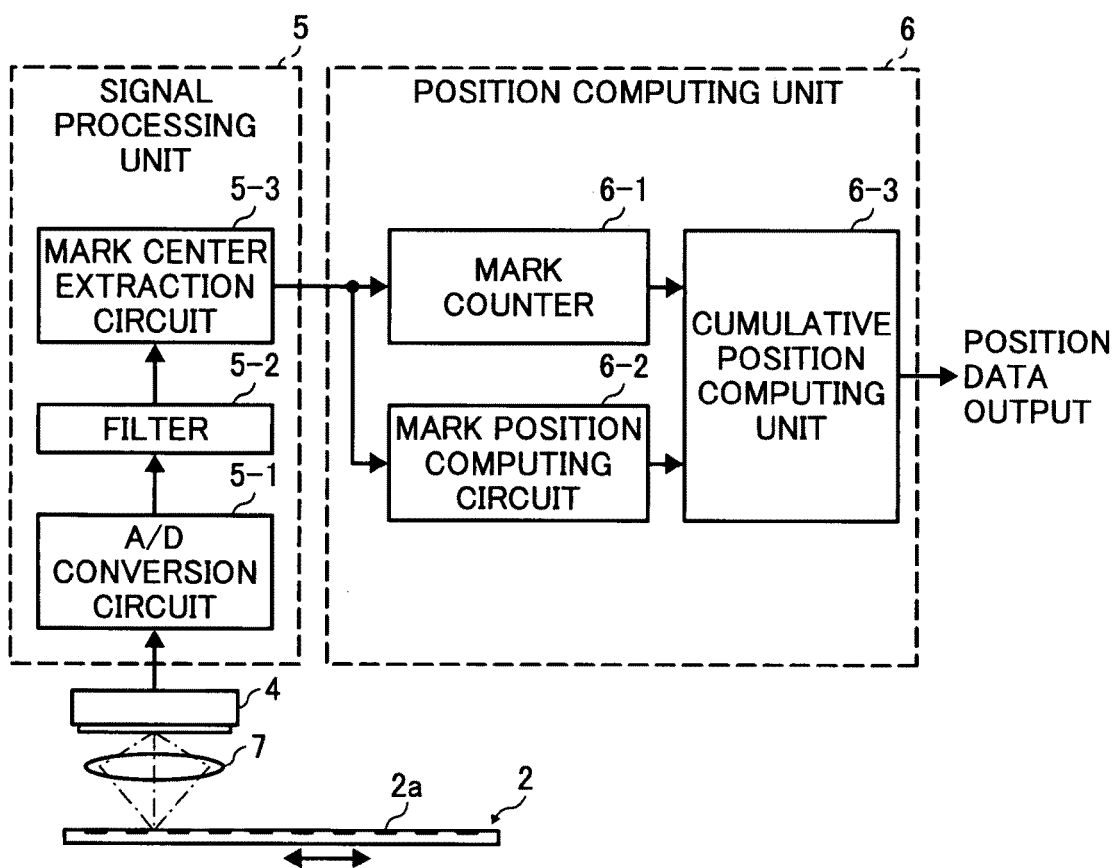
FIG. 2 is a block diagram illustrating a configuration of the relative position detection device according to at least one example embodiment.
Figure 3:
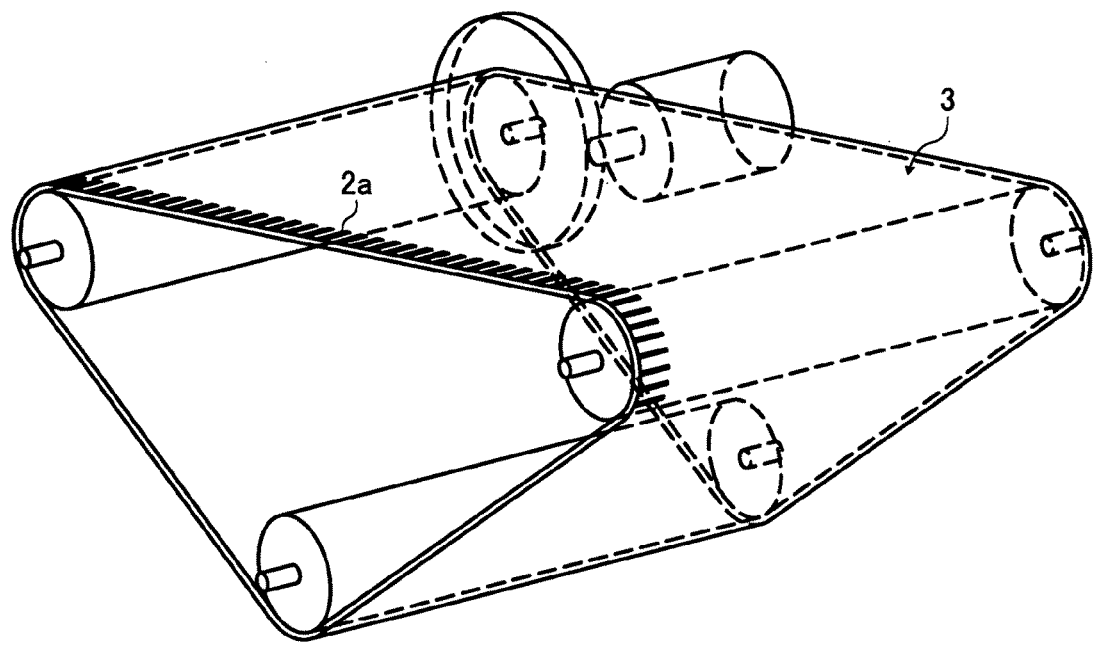
FIG. 3 is a diagram illustrating a configuration of an endless belt conveyor apparatus to which the relative position detection device according to at least one example embodiment is applied.
Figure 4:
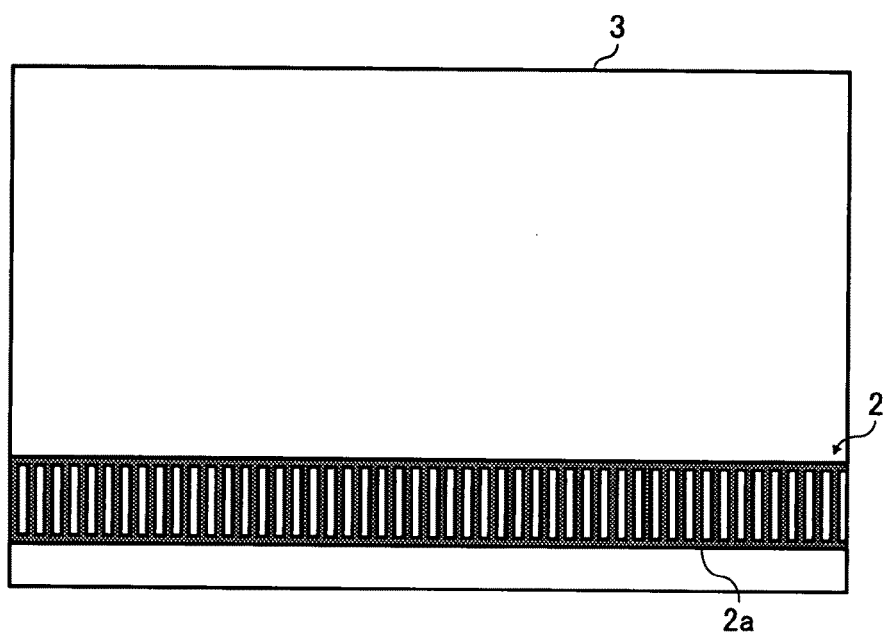
FIG. 4 is a diagram illustrating an example scale provided to a conveyor belt.

FIG. 1 is a schematic perspective diagram illustrating a configuration of a relative position detection device according to at least one example embodiment. FIG. 2 is a block diagram illustrating the configuration of the relative position detection device according to at least one example embodiment. FIG. 3 is a diagram illustrating a configuration of an endless belt conveyor apparatus to which the relative position detection device according to at least one example embodiment is applied. FIG. 4 is a diagram illustrating an example scale provided to a conveyor belt.

As illustrated in FIGS. 1 and 2, the relative position detection device according to at least one example embodiment includes a light source 1, a scale 2, a line sensor 4 serving as a light receiving unit, a signal processing unit 5, and/or a position computing unit 6. On the scale 2, optical marks 2a are formed at regular intervals by changing the reflectance or transmittance. When the relative position detection device according to at least one example embodiment is applied to an endless belt conveyor apparatus as illustrated in FIG. 3, the scale 2 is formed on the front side or the back side of an endless belt 3.

The line sensor 4 is an image pickup device that captures an image of the optical mark 2a according to a constant sampling cycle. The signal processing unit 5 includes an analogue to digital (A/D) conversion circuit 5-1 that converts analogue data from the line sensor 4 into digital data, a filter 5-2 that filters out noise in the data, and/or a mark center extraction circuit 5-3 that extracts the center position of the optical mark 2a from density data. The position computing unit 6 computes the position and speed of the scale 2 from the density data received from the signal processing unit 5 and outputs the position data. The position computing unit 6 includes a mark counter 6-1 that is incremented when the optical mark 2a passes the reference position, a mark position computing circuit 6-2 that calculates the displacement of the optical mark 2a from the reference position, and a cumulative position computing unit 6-3 that calculates the current position based on the mark counter value and the distance from the reference position to the optical mark 2a. The arithmetic operation is described below.

On the scale 2, the optical marks 2a having a different reflectance or transmittance from that of a base material are sequentially formed at regular intervals. The optical marks 2a are formed such that the amount of light received by the line sensor 4 changes upon the optical mark 2a. It should be noted that the optical mark 2a is not limited to a black line as in FIGS. 1-2, but can be a white mark on a black background or a mark of transmission type such as a metallic slit. As illustrated in FIG. 2, an imaging lens 7 is provided between the scale 2 and the line sensor 4 to focus an image of the optical mark 2a thereon. The light source 1 is used to efficiently receive light and obtain a signal with a higher S/N ratio by irradiating the scale 2.

Figure 5:
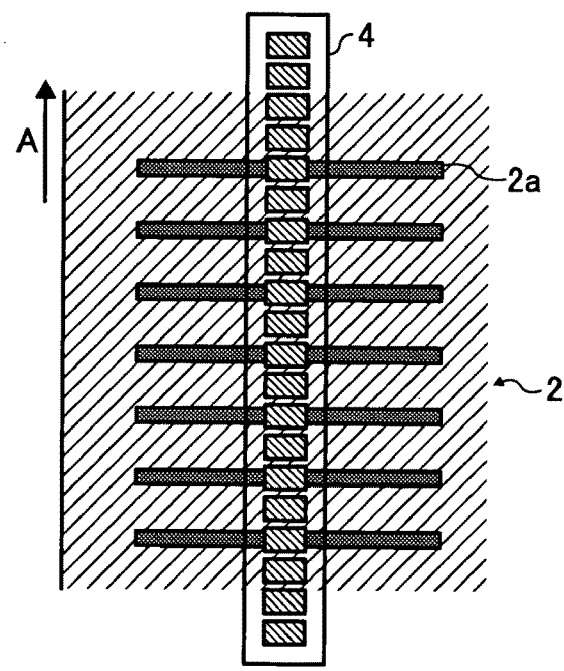
FIG. 5 is a diagram illustrating an example arrangement of a line sensor in a conventional relative position detection device.

FIG. 5 is a diagram illustrating an example arrangement of a line sensor in a conventional relative position detection device. FIG. 6 is a diagram illustrating an example arrangement of a line sensor in the relative position detection device according to at least one example embodiment.

The line sensor 4 is generally disposed in parallel to a direction A, which is the direction of movement of the scale 2, to detect the marks on the scale as illustrated in FIG. 5. By comparison, in at least one example embodiment, the line sensor 4 is slanted with respect to the direction A to improve the resolution of the line sensor 4 as illustrated in FIG. 6.

The improvement of the resolution by slanting the line sensor 4 is described below with reference to FIG. 7.

Figure 7:
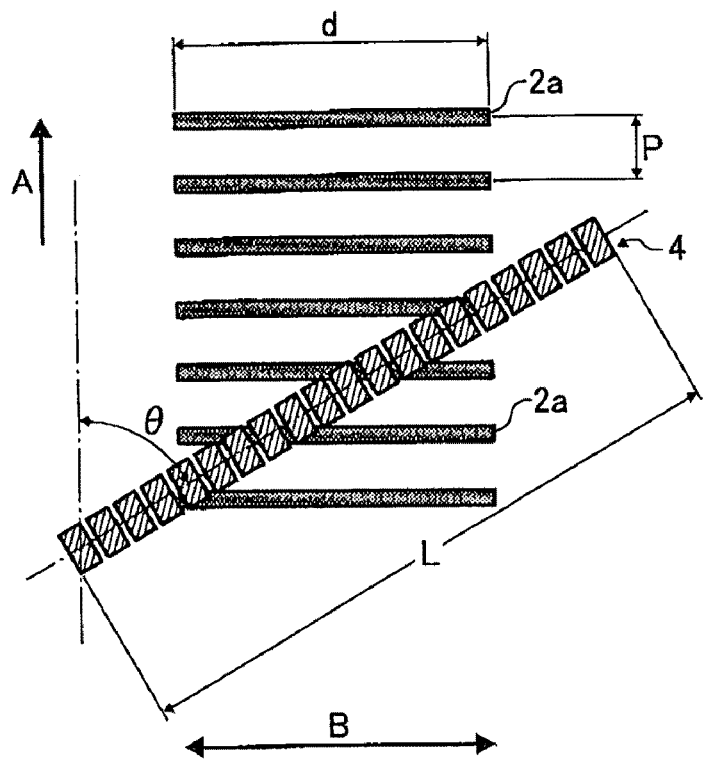
FIG. 7 is a diagram illustrating an example arrangement of optical marks on a scale and the line sensor.

FIG. 7 is a diagram illustrating an example arrangement of the optical marks 2a on the scale 2 and the line sensor 4.

The optical marks 2a have a width d and a pitch P. The line sensor 4 has a length L and slants at an angle θ relative to the direction A, which is the direction of movement of the scale 2. The movement of the scale 2 in the direction A is translated into the movement of the optical mark 2a on the line sensor 4 in the longitudinal direction of the line sensor 4. When the scale 2 moves a distance equal to the pitch P, a distance L1 traveled by the optical mark 2a on the line sensor 4 is P/cos θ.

When the optical mark 2a moves a distance x1 on the line sensor 4, a real distance x0 traveled by the scale 2 is calculated by the following relationship:

$$x0 = x1 \cdot \cos \theta$$

When the scale pattern is inclined as in the conventional relative position detection device, the movement of the scale 2 in a direction B, which is perpendicular to the direction A, is translated into the movement of the scale 2 in the direction A on the line sensor 4.

By comparison, according to at least one example embodiment, because the optical marks 2a on the scale 2 are in parallel to the direction B. Therefore, the image on the line sensor 4 is not affected by the movement in the direction B.

Therefore, by slanting the line sensor 4, the relative position detection device according to at least one example embodiment is a more accurate relative position detection device, magnifying the movement of the scale 2 by 1/cos θ times without measurement errors due to the movement in the direction perpendicular to the direction of movement of the scale 2.

In a relative position detection device according to at least one example embodiment, the optical marks 2a on the scale 2 are formed of lines having a fixed width arranged in parallel to the direction of movement of the scale 2. The area read by the line sensor 4 has a width wider than the width of the optical mark 2a. Therefore, the displacement of the scale 2 relative to the line sensor 4 in the direction perpendicular to the movement of the scale 2 is simultaneously detected based on the limits of movement of the optical mark 2a read by the line sensor 4 in the width direction thereof.

Figure 8:
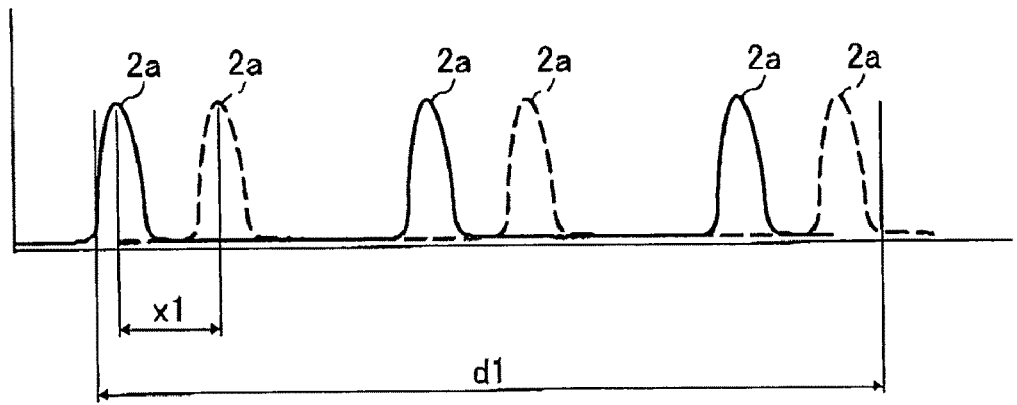
FIG. 8 is a diagram illustrating detection waveforms of the optical marks by the relative position detection device according to at least one example embodiment.

The operation of the relative position detection device according to at least one example embodiment is described with reference to FIGS. 7 and 8.

In at least one example embodiment, the optical mark 2a on the scale 2 has a fixed width d. As illustrated in FIG. 8, the optical mark 2a moves on the line sensor 4 in accordance with the movement of the scale 2. Because the width of the optical mark 2a is fixed, the limits of the movement of the optical mark 2a in the longitudinal direction of the line sensor 4 are determined. A projection width d1 of the optical mark 2a on the line sensor 4 is expressed by the following relationship:

$$d1 = d/\sin \theta$$

When sampling is sufficiently faster than the movement of the scale 2, the image of the scale 2 moves within the width d1. By finding the center position of the width d1 from the upper and lower limits, the displacement of the scale 2 in the direction perpendicular to the direction of movement of the scale 2 is detected.

Therefore, the movement of the scale 2 relative to the line sensor 4 in the direction A and the displacement in the direction B can be observed by using the relative position detection device having the above-described configuration.

In the relative position detection device according to at least one example embodiment, a mark for detection of the displacement in the direction B is provided together with the optical marks 2a on the scale 2 to improve the detection accuracy in the direction B.

Figure 9:
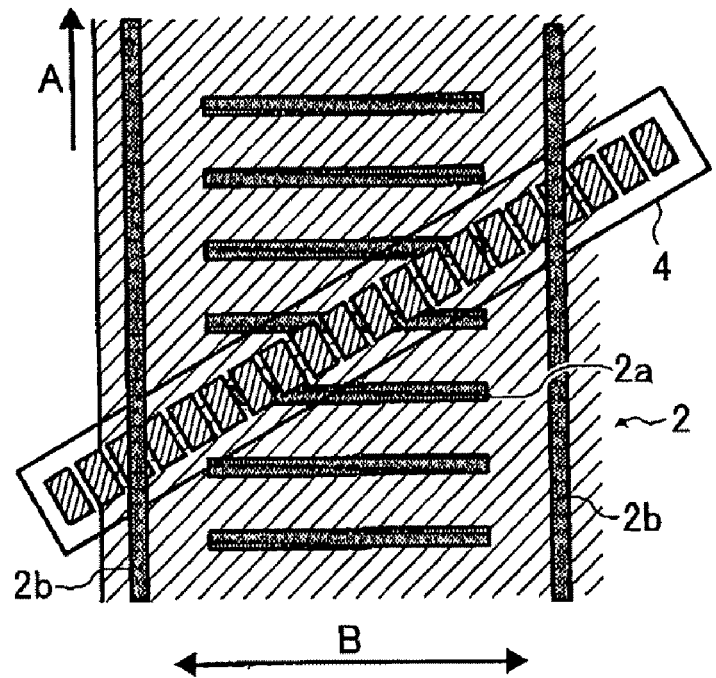
FIG. 9 is a diagram illustrating an example arrangement of a line sensor in a relative position detection device according to at least one example embodiment.
Figure 10:
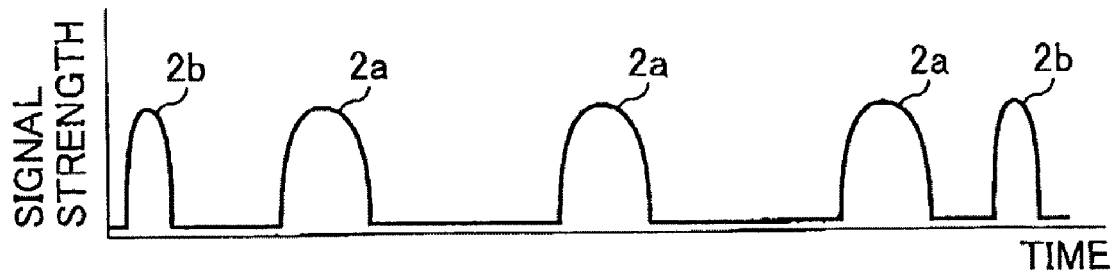
FIG. 10 is a diagram illustrating a detection waveform of optical marks by the relative position detection device according to at least one example embodiment.

As illustrated in FIG. 9, an endless line 2b is provided in parallel to the direction A, which is the direction of movement of the scale 2. It should be noted that although the line 2b is provided on each side of the optical mark 2a in FIG. 9, the line 2b can be provided only on either side of the optical marks 2a. When reading the scale 2 of FIG. 9, the line sensor 4 outputs a signal as illustrated in FIG. 10, where the horizontal axis represents time and the vertical axis represents signal strength. The pulses on both ends in the diagram of FIG. 10 correspond to the images of the lines 2b for use in detection of the displacement in the direction B. When the scale 2 is not moved in the direction B, the pulse of the lines 2b is continuously observed at the same position and three pulses corresponding to the images of the optical marks 2a move therebetween in accordance with the movement of the scale 2 in the direction A.

In example embodiments, data is obtained by a plurality of samples to determine the upper and lower limits. In other example embodiments, the displacement in the direction Y may be obtained by a single sample.

The relative position detection device according to at least one example embodiment includes a computing unit that corrects an error in the interval between the optical marks 2a or compensates for expansion and contraction of the scale 2 by calculating an interval between the optical marks 2a on the scale 2. In example embodiments, the line sensor 4 continuously detects at least two optical marks 2a.

Figure 11A:
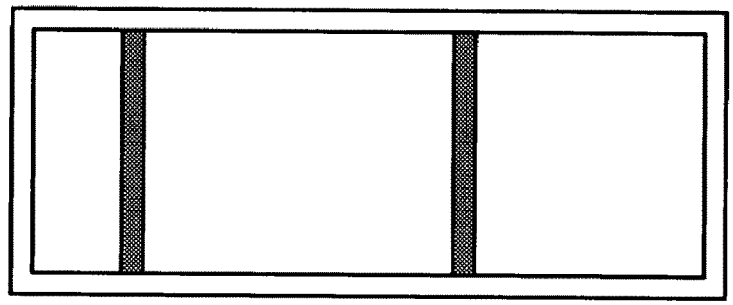
FIGS. 11A, 11B, and 11C are diagrams illustrating an example in which images of the optical marks on a scale are on a light receiving surface of a line sensor.
Figure 11B:
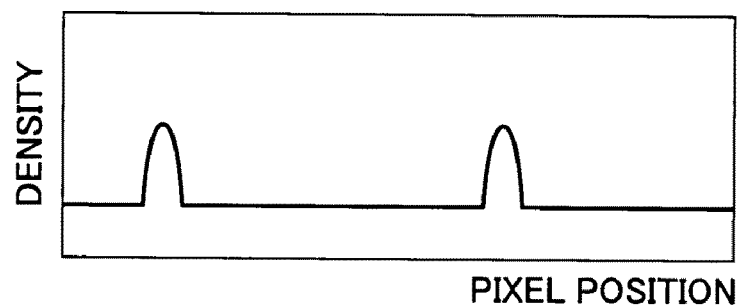
Figure 11C:
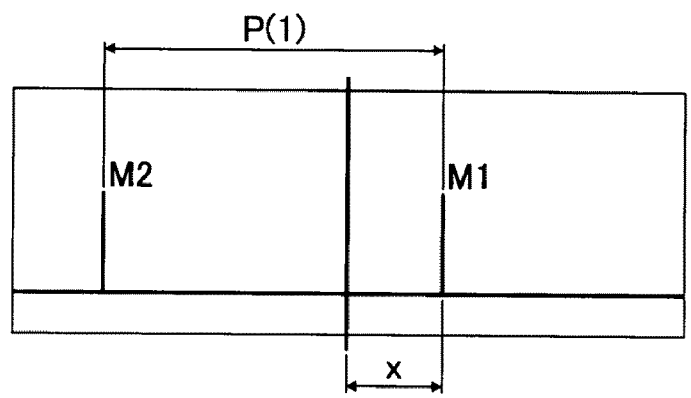

FIGS. 11A, 11B, and 11C are diagrams illustrating an example in which images of the optical marks 2a on the scale 2 are on the light receiving surface of the line sensor 4. FIG. 11A illustrates an image projected onto the line sensor 4. FIG. 11B illustrates density data after A/D conversion by the signal processing unit 5, where the horizontal axis represents pixel position and the vertical axis represents density. FIG. 11C illustrates mark center extraction data. The operation is the same as the operation according to previously described example embodiments, and therefore description thereof is omitted.

In FIGS. 11A, 11B, and 11C, images of two optical marks 2a are produced on the line sensor. In a conventional relative position detection device, a correlation coefficient between the density data of each optical mark 2a is computed and a position with the highest correlation coefficient is adopted as a relative moved position. By comparison, in example embodiments, the travel distance of the optical mark 2a is calculated by the following relationship:

$$X = P \times N + x,$$

where X is the travel distance of the optical mark 2a, P is the pitch between the optical marks 2a, which is referred to as mark pitch hereinafter, N is a mark counter value indicating the number of optical marks 2a passing the reference position, and x is a distance from the reference position to the optical mark 2a.

In a conventional relative position detection device, because the correlation coefficient is calculated for every pixel, a large number of calculations is involved. By comparison, example embodiments, the travel distance is obtained simply by producing data on the center position of the optical mark 2a from the density data and calculating the position of the optical mark 2a.

A cumulative travel distance is calculated not by adding the travel distances X obtained but by using the number of the optical marks 2a passing the reference position and the current distance x. Therefore, the displacement is detected with the accuracy in accordance with the accuracy of the mark.

In FIG. 11C, M1 and M2 with a pitch P(1) therebetween represent the center positions of the optical marks 2a.

When the mark pitch on the scale is not accurate, or higher accuracy measurement is desired, the mark pitch is calculated and the position of the optical mark 2a is calculated by the following relationship:

$$X = \Sigma(P(k)) + x,$$

where X is the position of the optical mark 2a.

By correcting the interval between the optical marks 2a during the computation of the travel distance, a cumulative position is measured with higher accuracy.

Figure 12:
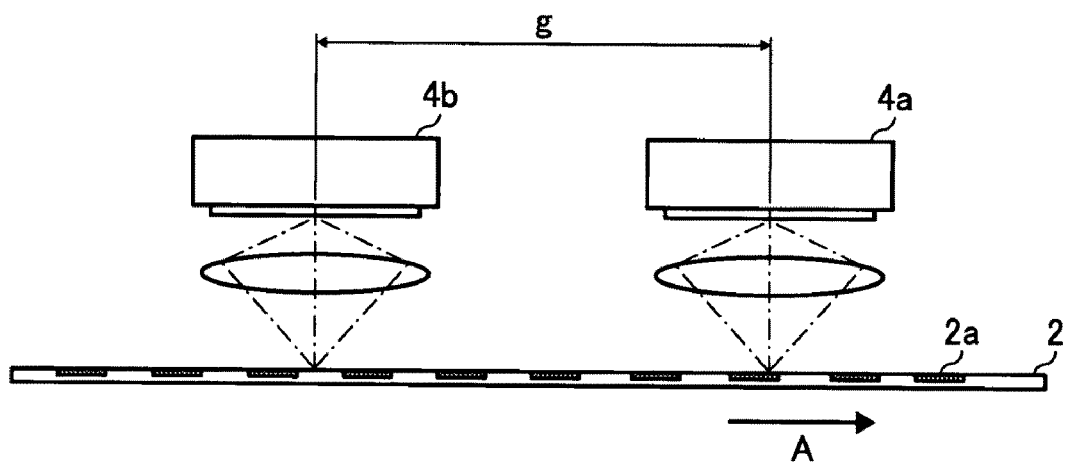
FIG. 12 is a diagram illustrating a relative position detection device according to at least one example embodiment.

FIG. 12 is a diagram illustrating a relative position detection device according to at least one example embodiment. In example embodiments, a plurality of line sensors are disposed in the direction of movement of the scale 2.

Figure 13A:
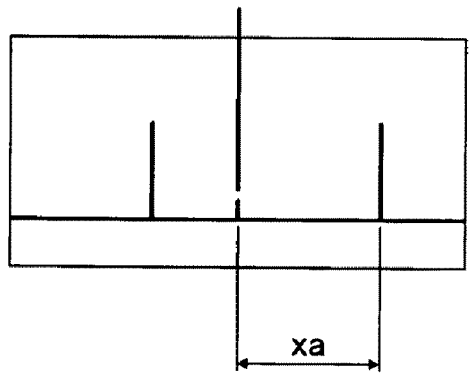
FIGS. 13A and 13B are diagrams illustrating the relative position detection device according to at least one example embodiment.
Figure 13B:
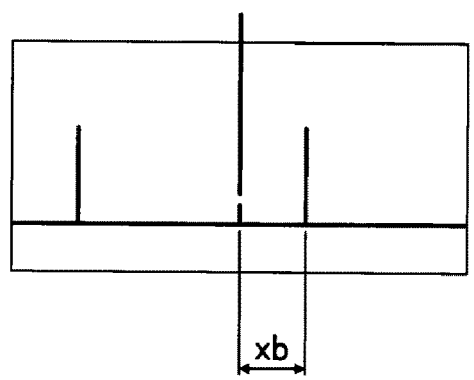

As illustrated in FIG. 12, line sensors 4a and 4b are placed with an interval g (g=m×P). FIGS. 13A and 13B illustrate images obtained by the line sensors 4a and 4b, respectively. The data Pm of the mark position obtained by the line sensors 4a and 4b is expressed as follows:

$$Pm = P + (xa - xb)/m,$$

where xa−xb represents the displacement from the mark pitch P. Therefore, the mark pitch is corrected. By expanding the gap between the line sensors 4a and 4b, an error in the mark pitch is magnified m times. Accordingly, the mark pitch is corrected with higher accuracy.

Figure 14A:
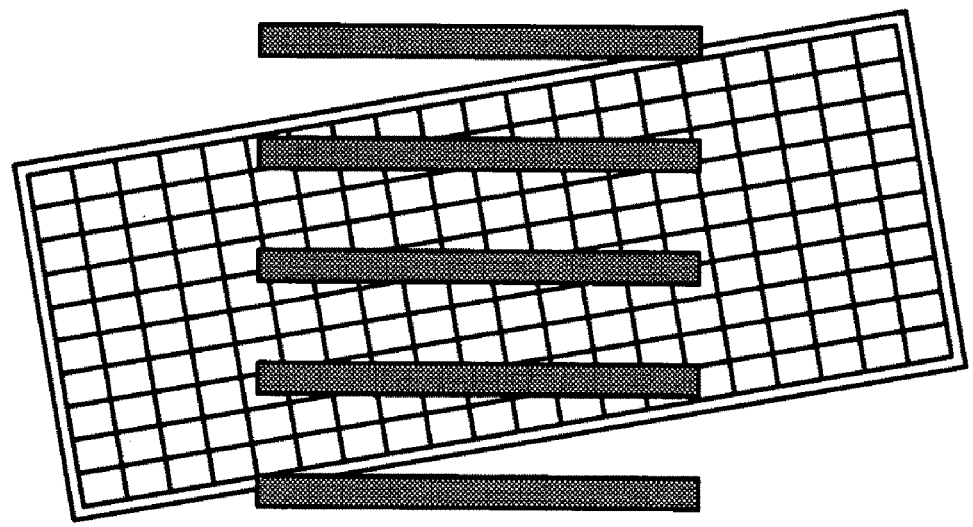
FIGS. 14A and 14B are diagrams illustrating a relative position detection device according to at least one example embodiment.
Figure 14B:
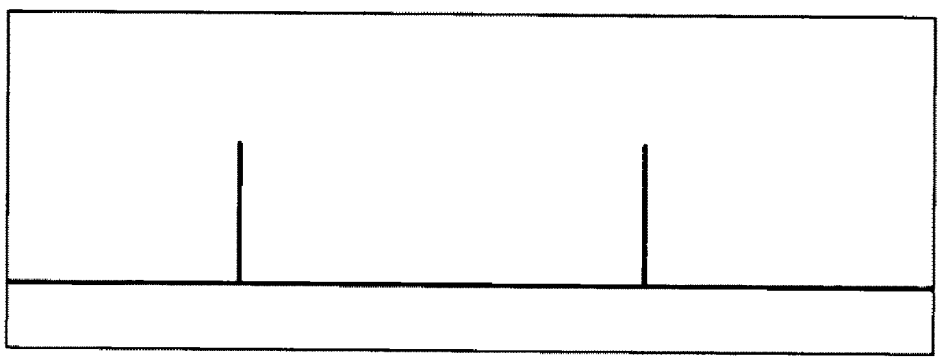

FIG. 14 is a diagram illustrating at least one example embodiment. In example embodiments, a two-dimensional image sensor is used in place of the line sensor. In example embodiments, the scale 2 is disposed in a two-dimensional direction. The number of the optical marks 2a that can be detected in this configuration increases. An averaging process evens out irregularity of the optical marks 2a and therefore, measurement is performed with higher accuracy. It is obvious that this configuration is effective in detection not only in the direction A but also in the direction B. The image sensor can be replaced with a light receiving element array.

Figure 15A:
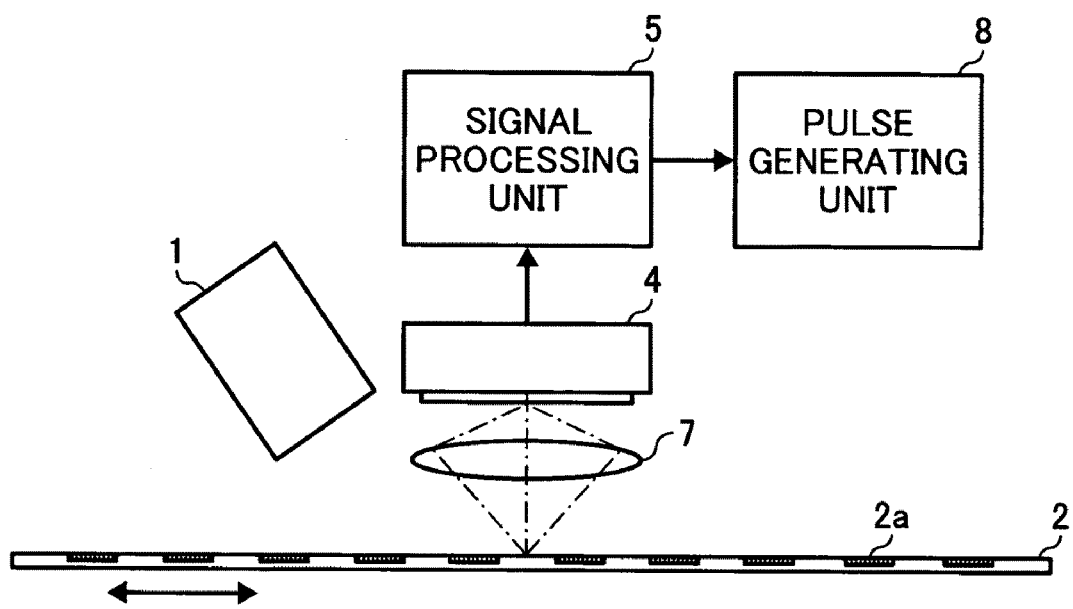
FIGS. 15A and 15B are diagrams illustrating a relative position detection device according to at least one example embodiment.
Figure 15B:
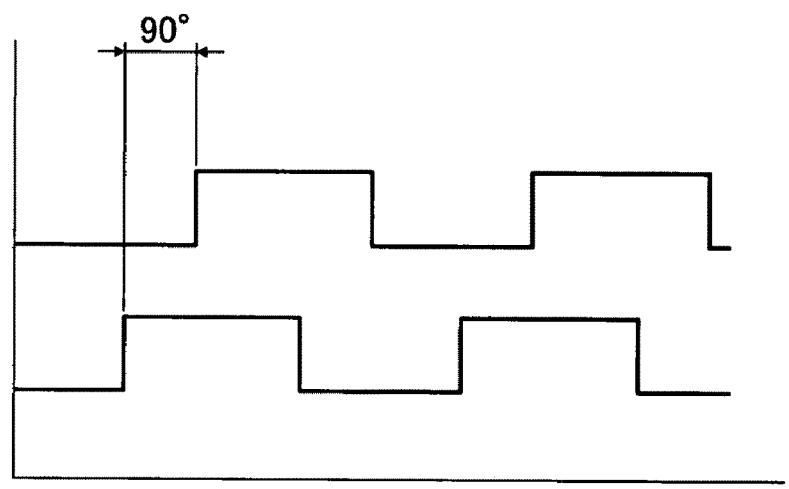

FIG. 15A illustrates a configuration of a relative position detection device according to at least one example embodiment. The image sensor can be replaced with a commonly used encoder sensor in the case in which the output signal of the line sensor 4 is processed and AB-phase pulse signals with a phase difference of an electrical angle of 90 degrees therebetween are output. In example embodiments, as illustrated in FIG. 15A, a pulse generating unit 8 is provided in a stage following the signal processing unit 5 to generate the AB-phase pulse signals illustrated in FIG. 15B.

The configuration of a relative position detection device according to at least one example embodiment is the same as the configuration of the relative position detection device according to example embodiments illustrated in FIGS. 1 and 2, and therefore description thereof is omitted.

In at least one example embodiment, two light receiving elements 81 and 82 serving as light receiving units are provided as a substitute for the line sensor 4, as illustrated in FIG. 16. The number of light receiving elements is two in example embodiments, but not limited thereto. The light receiving elements 81 and 82 are provided as separate units, however, a single line sensor 4 having separate light receiving areas may be used instead. In example embodiments, the light receiving areas are formed such that the area read by the line sensor 4 has a width wider than the width of the optical mark 2a.

In example embodiments, the two light receiving elements 81 and 82 are displaced from each other in the direction of movement of the scale and the direction perpendicular thereto. The displacement with respect to the direction of movement of the scale 2 allows correction of errors in the mark pitch on the scale 2. The displacement with respect to the direction perpendicular to the direction of movement of the scale 2 allows detection of deviation of the scale 2.

A principle of the detection of deviation is described.

Figure 17A:
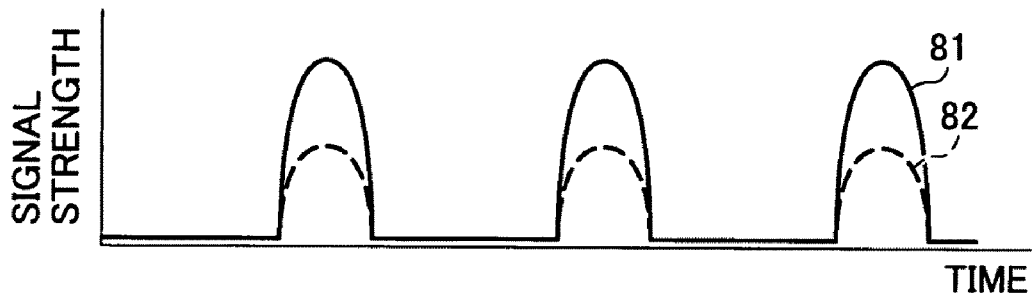
FIGS. 17A, 17B, and 17C are example diagrams illustrating a principle of detection of deviation.
Figure 17B:
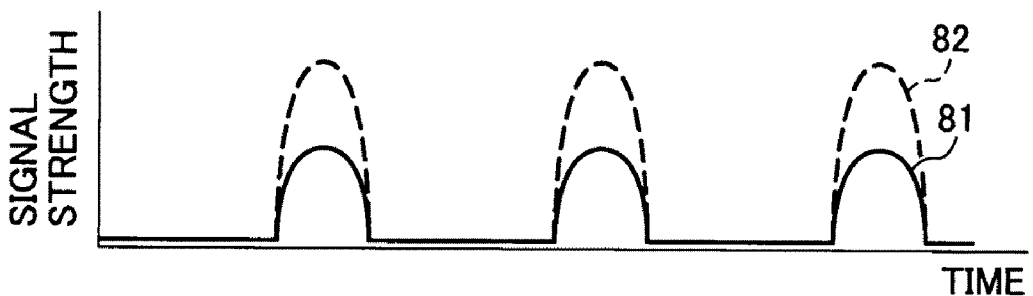
Figure 17C:
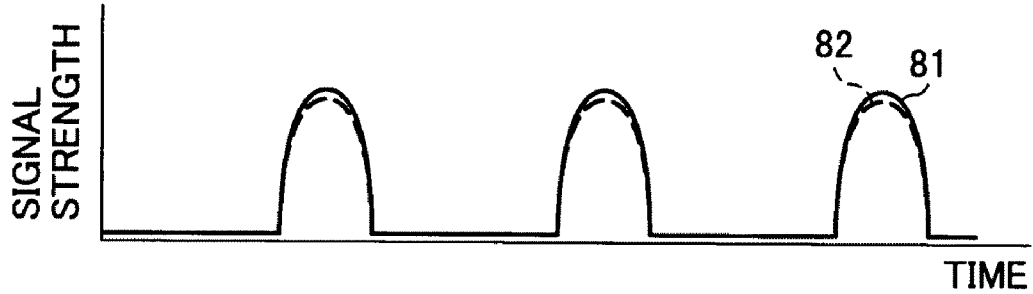

FIGS. 17A, 17B, and 17C are diagrams illustrating the principle of the detection of deviation, where each horizontal axis represents time and each vertical axis represents signal strength.

When the scale 2 deviates to the right (indicated by R in FIG. 16), e.g., moves to the light receiving element 81, the area of the optical mark 2a from which the light is received by the light receiving element 81 increases. Therefore, as illustrated in FIG. 17A, the signal strength of the light received by the light receiving element 81 increases and the signal strength of the light received by the light receiving element 82 decreases. On the contrary, when the scale 2 deviates to the left (indicated by L in FIG. 16), the signal strength of the light received by the light receiving element 81 decreases and the signal strength of the light received by the light receiving element 82 increases, as illustrated in FIG. 17B.

By comparing the signal strengths obtained by the light receiving elements 81 and 82, deviation of the scale 2 is detected. Example relative position detection devices may be applied to a belt conveyor apparatus, or a control device, for example, a steering roller, provided to control the deviation to equalize the signal strength between the light receiving elements 81 and 82 as illustrated in FIG. 17C, which leads to more stable belt conveyance.

Next, an example method of correcting the mark pitch is described.

Figure 18A:
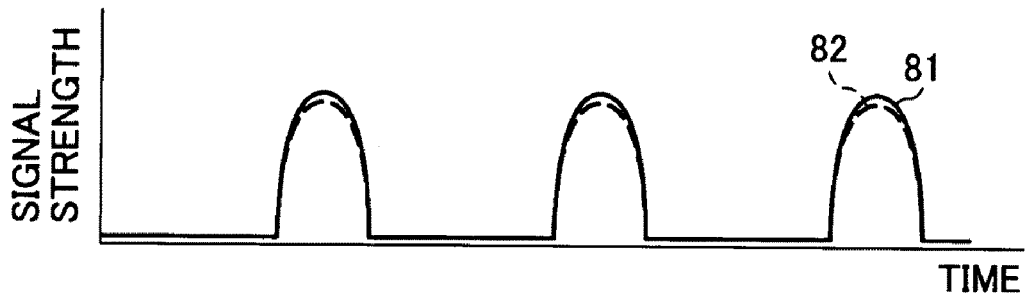
FIGS. 18A, 18B, and 18C are example diagrams illustrating waveforms of output signals of two light receiving elements.
Figure 18B:
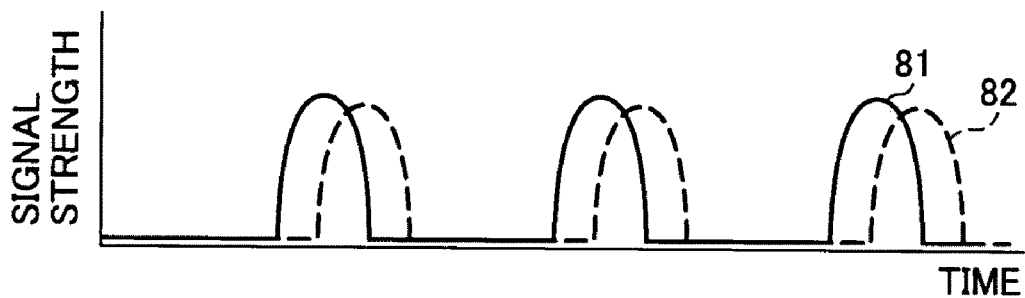
Figure 18C:
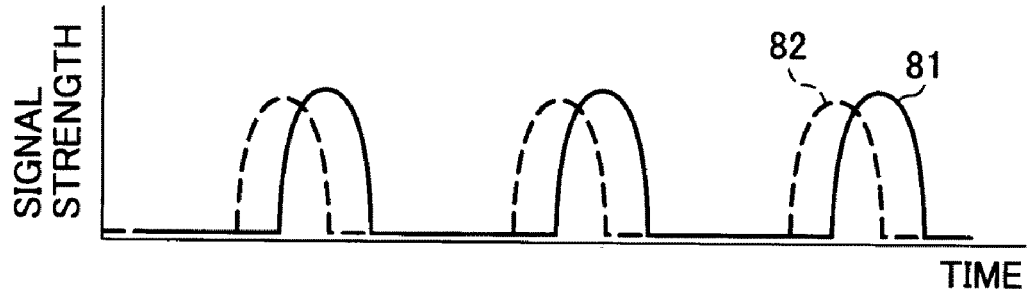

FIGS. 18A, 18B, and 18C illustrate example waveforms of the output signals from the two light receiving element 81 and 82, where each horizontal axis represents time and each vertical axis represents signal strength. For sake of simplicity in this example, there is no deviation of the scale 2 and the interval between the light receiving elements 81 and 82 is set to an integral (n) multiple of the length of the mark pitch.

When there is no error in the mark pitch, the two signals are in phase as illustrated in FIG. 18A. When the mark pitch is increased, the phase of the signal from the light receiving element 82 is delayed as illustrated in FIG. 18B. When the mark pitch is decreased; the phase of the signal from the light receiving element 82 is advanced as illustrated in FIG. 18C.

The rate of change of the mark pitch is calculated by the following relationship:

$$R = Cab \cdot V / L0,$$

where R is the rate of change of the mark pitch, Cab is the phase difference, V is the belt linear velocity, and L0 is the interval between the light receiving areas. L0 is set to an integral (n) multiple of the length of the mark pitch P, i.e., $L0 = n \cdot P$, and V is expressed by P/Ca, where Ca represents a signal cycle. By assigning n·P and P/Ca to L0 and V, respectively, the above-described relationship is expressed as follows:

$$R = Cab \cdot (P/Ca)/(n \cdot P) = Cab/(n \cdot Ca)$$

The real belt linear velocity $V_{real}$ is calculated by the following relationship:

$$V_{real} = P(1+R)/Ca$$

The cumulative position is calculated by multiplying a counter value N incremented on edges of the sensor signal by the mark pitch P. Therefore, a corrected cumulative position Lreal is expressed by the following relationship:

$$Lreal = N \cdot P + \Sigma(P \cdot R(k)),$$

where R(k) is a mark pitch error rate per mark pitch. The real cumulative travel distance is obtained by adding the integral value of errors in the mark pitch.

As described above, according to at least one example embodiment, the mark pitch is corrected by using the phase difference between the signals from the two light receiving elements 81 and 82. Therefore, errors in the mark pitch do not prevent accurate measurement of the real velocity of a traveling component.

According to at least one example embodiment, a single sensor provides two functions of measurement of deviation and correction of the mark pitch, which is effective in reducing cost and size. In addition, at least one example embodiment provides higher accuracy measurement of speed and position by eliminating errors in the positions of two sensors, errors in the correction of the mark pitch caused by fluctuation in the mark pitch due to environmental factors, and/or measurement errors due to the difference in characteristics between the two sensors.

Figure 19A:
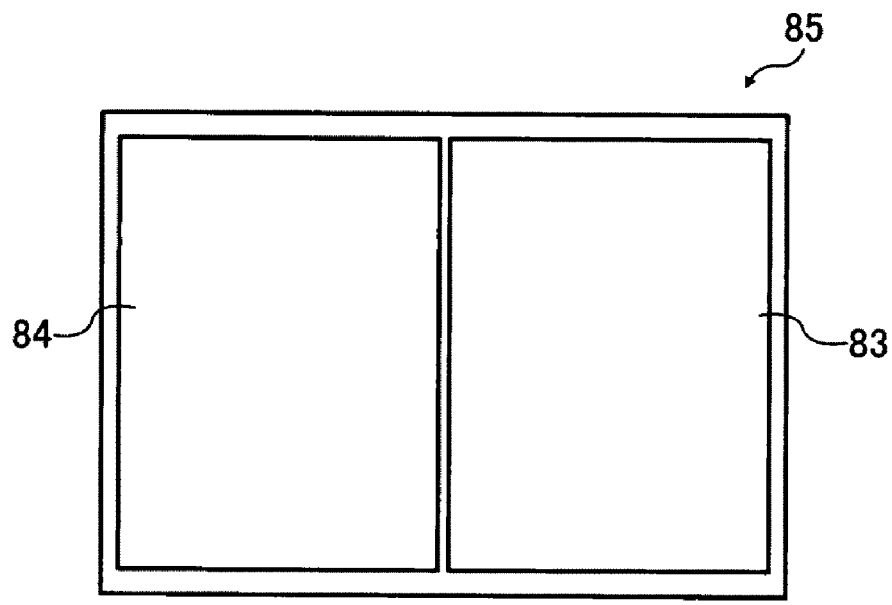
FIGS. 19A and 19B are diagrams illustrating a light receiving element and a mask, respectively, included in a relative position detection device according to at least one example embodiment.
Figure 19B:
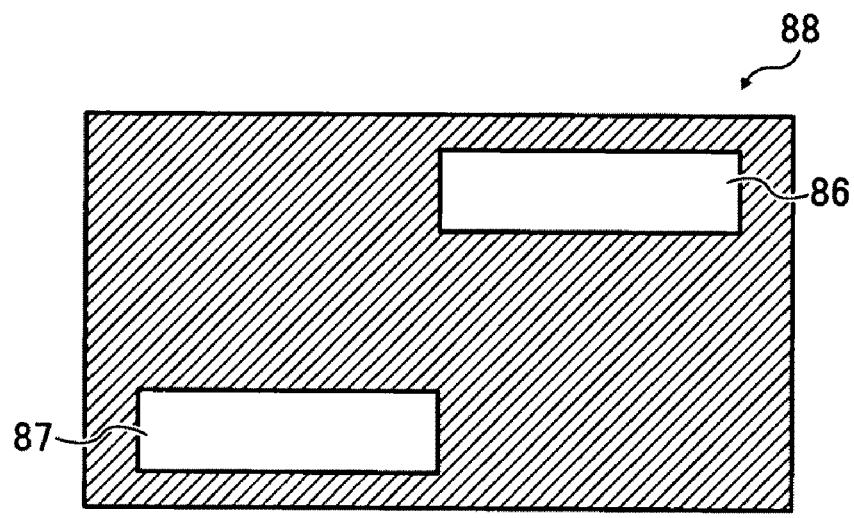

FIG. 19A is a diagram illustrating an example light receiving element and FIG. 19B is a diagram illustrating an example mask pattern. According to at least one embodiment, a light receiving element 85 including a plurality of light receiving areas 83 and 84 and a mask 88 having openings 86 and 87 arranged as desired are combined to provide the same function as two light receiving elements that are displaced from each other. A light receiving element 85 including light receiving areas 83 and 84 that are displaced from each other provides an inexpensive way to ensure higher accuracy position measurement.

Figure 20:
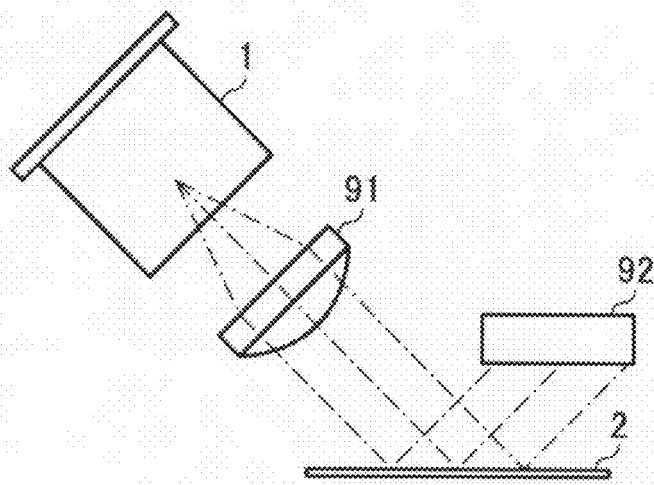
FIG. 20 is a diagram illustrating at least one example embodiment.
Figure 21:
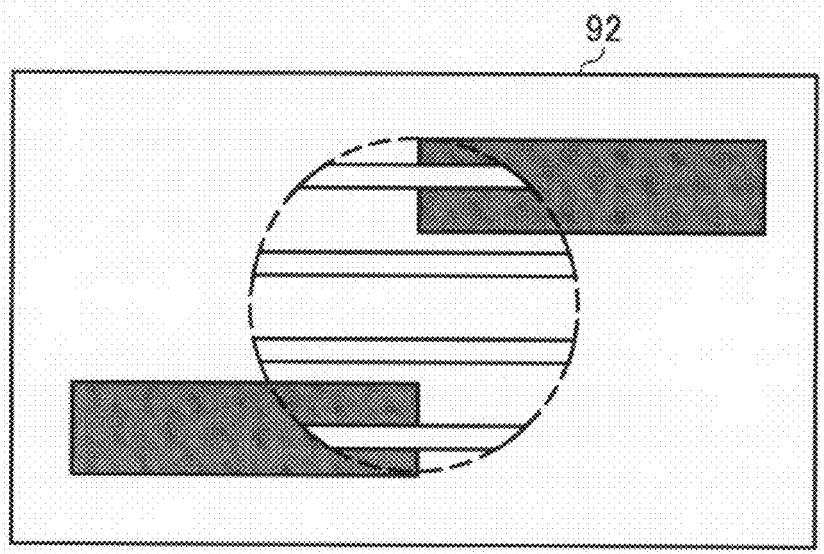
FIG. 21 is a diagram illustrating at least one example embodiment.

FIGS. 20 and 21 illustrate at least one example embodiment. FIG. 20 illustrates an example case in which a collimated beam of light is produced from the light source. FIG. 21 illustrates a pattern of beams projected onto the light receiving element. In example embodiments, the light from the light source 1 is converted into a collimated beam of light. While the light source 1 in at least one of the above-described embodiments irradiates the scale 2, the light source 1 in other example embodiments not only irradiates the optical marks 2a on the scale 2 but also projects the optical mark 2a onto a light receiving element 92. The scale 2 includes a total reflection mark or a transmission mark.

In FIG. 20, an example in which the scale 2 includes reflection marks is illustrated. In example embodiments, when the light from the light source 1 is converted into a collimated beam of light by a collimator lens 91 and the scale 2 is irradiated with the light, the light is reflected only from a portion with a reflection mark, as illustrated in FIG. 21. Therefore, a pattern of the light beams that is similar to the optical marks 2a on the scale 2 is formed on the light receiving element 92. When the light from the light source is scattered or converged, the pattern of the optical marks 2a on the scale 2 is not reproduced.

As for the light source 1 used in at least one example embodiment, a light source having a smaller area may be used to provide spatial coherence. Examples of an inexpensive light source having a smaller light emitting area include a semiconductor laser, a point light source LED (light-emitting diode), etc.

By converting the light from the light source into a collimated beam, the optical mark 2a is directly projected onto the light receiving element 92, which eliminates the use of imaging optics and defocusing caused by fluctuation in the interval between the scale 2 and the light receiving element 92 and provides stable measurement. This configuration is effective in detecting an object that may move up and down in, for example, a belt conveyor apparatus or a drum rotation apparatus.

Each of the above-described relative position detection devices according to example embodiments can be applied to a rotary encoder.

Figure 22:
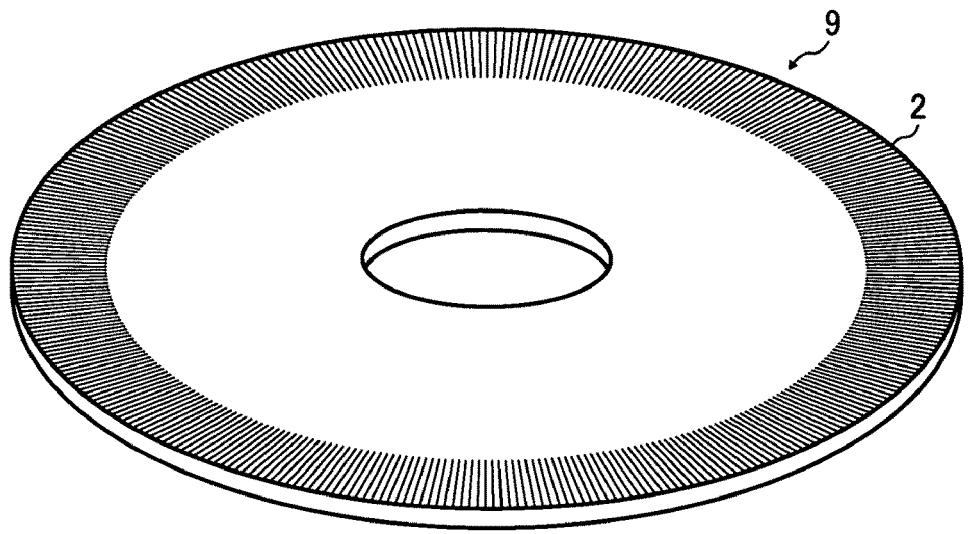
FIG. 22 is an example diagram illustrating a scale formed in a circular pattern.

FIG. 22 is a diagram illustrating an example case in which the relative position detection device according to example embodiments is applied to a rotary encoder 9. In example embodiments, the scale 2 is formed on the rotary encoder 9 in a circular pattern.

As described above, the relative position detection device according to at least one example embodiment performs measurement while correcting the mark pitch. Therefore, the relative position detection device is suitable when the behavior or movement of a detection subject is affected by the environment. For example, there are a belt form traveling component which easily expands and/or contracts, and a cylindrical rotary component that may hit the head of an encoder.

Figure 23:
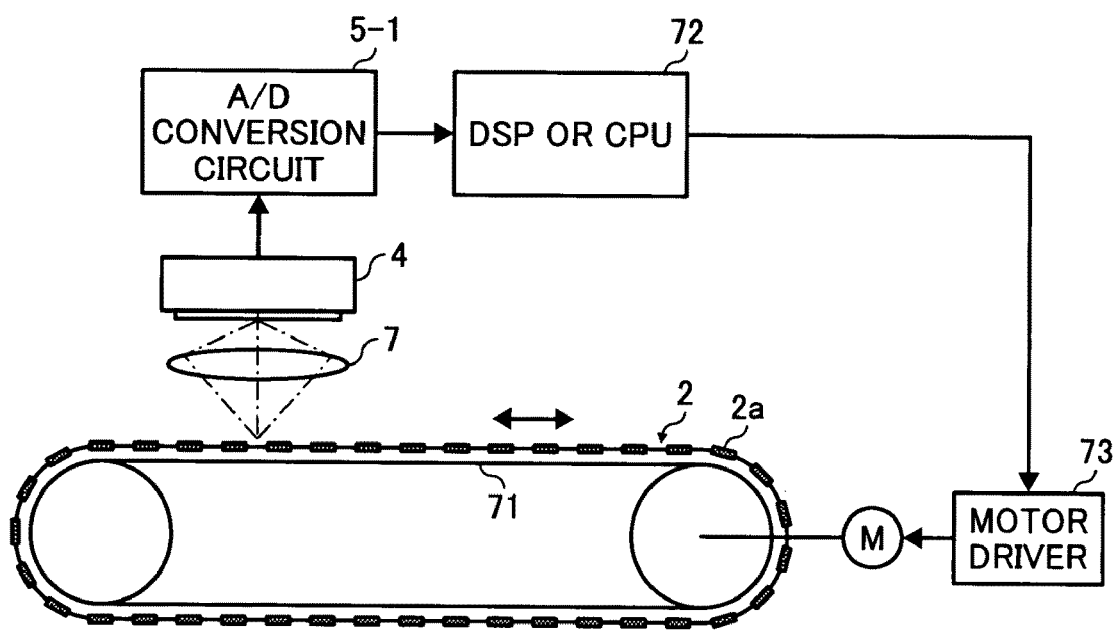
FIG. 23 is a schematic diagram illustrating an example application of the relative position detection device according to at least one example embodiment to a belt conveyor apparatus.

FIG. 23 is a schematic diagram illustrating an example application of the relative position detection device according to the embodiments to a belt conveyor apparatus.

In FIG. 23, the above-described scale 2 is provided on an end portion of a conveyor belt 71. The conveyor belt 71 is stretched by a drive roller and moved by the drive roller rotated by a motor M. The above-described relative position detection device detects the position change and speed change of the conveyor belt 71 by using the scale 2 on the conveyor belt 71. As a controller that controls a motor driver 73, a central processing unit (CPU) or digital signal processor (DSP) 72 may be used to perform software control. Because the position computation is also performed by a program, the CPU or DSP 72 can be shared for a simple configuration.

Figure 24:
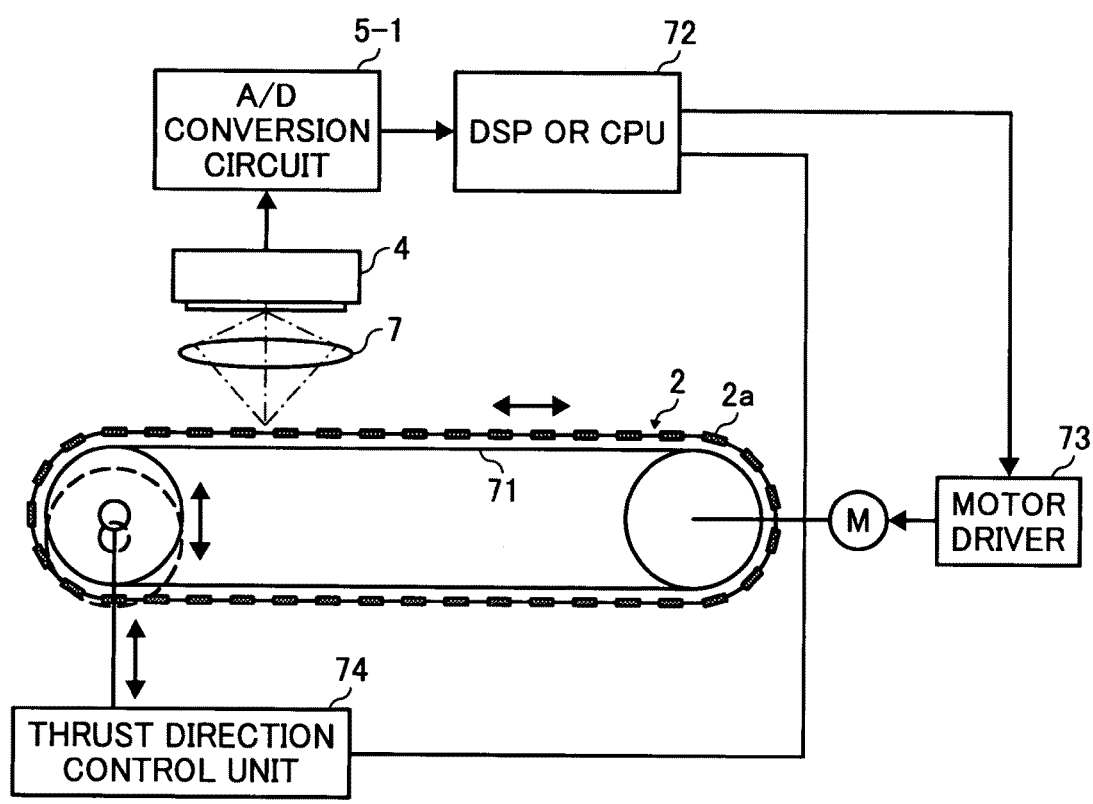
FIG. 24 is a schematic diagram illustrating another example application of the relative position detection device according to at least one example embodiment to a belt conveyor apparatus.

FIG. 24 is a schematic diagram illustrating another example application of the relative position detection device to a belt conveyor apparatus. The relative position detection devices according to example embodiments perform detection in the direction B as well as detection in the direction A. Accordingly, in the belt conveyor apparatus illustrated in FIG. 24, rotation of the conveyor belt 71 and adjustment in the thrust direction that is perpendicular to the direction of rotation of the conveyor belt 71 are simultaneously controlled by using a motor driver 73 (drive unit) that drives the conveyor belt 71 and a thrust direction control unit 74 that controls the thrust direction.

Figure 25:
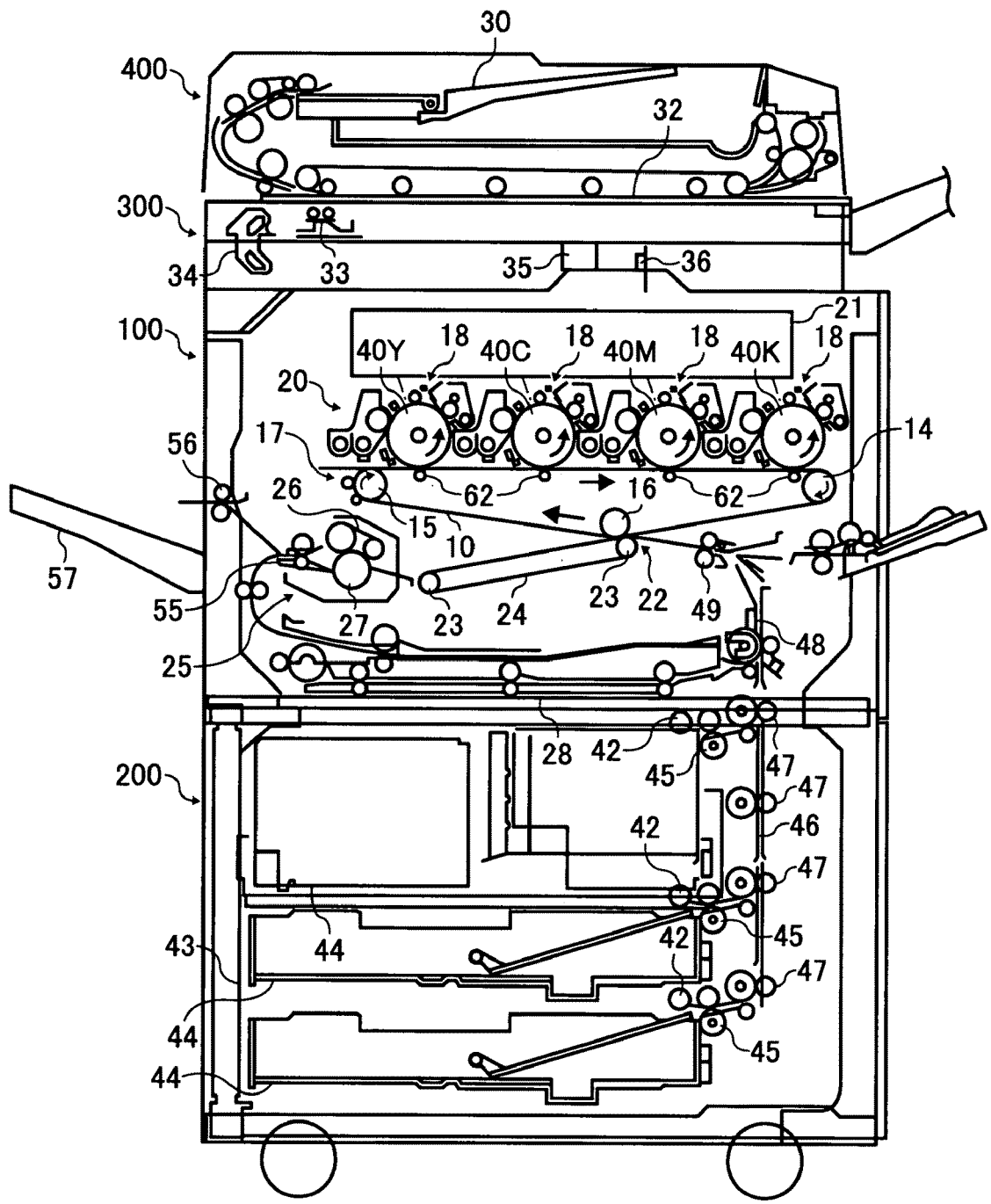
FIG. 25 is a schematic diagram illustrating an example application of a relative position detection device according to at least one example embodiment to an image forming apparatus.

FIG. 25 is a schematic diagram illustrating an example application of the relative position detection device to an image forming apparatus, which is a tandem color image forming apparatus that employs an indirect transfer system. The image forming apparatus includes a main body 100, a sheet feed table 200 that places the main body 100 thereon, a scanner 300 that is mounted on the main body 100, and/or an automatic document feeder (ADF) 400 that is mounted on the scanner 300.

The main body 100 includes an intermediate transfer unit 10, which is an endless belt, at its center. The intermediate transfer unit 10 is suspended around three support rollers (stretch rollers) 14, 15, and 16 and rotated clockwise. To the left of the support roller 15, a cleaning device 17 that removes residual toner remaining on the intermediate transfer unit 10 after image transfer is provided. On the intermediate transfer unit 10 stretched between the support rollers 14 and 15, four image forming units 18 for colors of black, cyan, magenta, and yellow are arranged side by side along the transfer direction of the intermediate transfer unit 10 to form a tandem image forming unit 20.

Immediately above the tandem image forming unit 20, an exposure device 21 is provided. A secondary transfer device 22 is provided opposing the tandem image forming unit 20 with the intermediate transfer unit 10 therebetween. The secondary transfer device 22 includes a secondary transfer belt 24 that is an endless belt suspended around two rollers 23. The secondary transfer device 22 is pressed against the support roller 16 with the intermediate transfer unit 10 therebetween and transfers an image on the intermediate transfer unit 10 to a recording medium. On the side of the secondary transfer device 22, a fixing device 25 is provided to fix the transferred image on the recording medium. The fixing device 25 includes an endless fixing belt 26 and a pressure roller 27 that is pressed against the fixing belt 26. The secondary transfer device 22 also conveys the recording medium to the fixing device 25 after the image transfer. As for the secondary transfer device 22, a transfer roller or a non-contact charger may be used.

Below the secondary transfer unit 22 and the fixing device 25 and in parallel with the tandem image forming unit 20, there is provided a sheet reversing device 28 that reverses the recording medium to form images on both sides of the recording medium.

To make a copy using this color image forming apparatus, an original is placed on an original table 30 that is included in the automatic document feeder 400. Alternatively, the automatic document feeder 400 is opened and an original can be placed on a contact glass 32 that is included in the scanner 300 and the original is held by closing the automatic document feeder 400.

By pressing a start switch, not shown, the scanner 300 is driven after the original placed on the original table 30 is transferred to the contact glass 32, or the scanner 300 is immediately driven when the original is placed on the contact glass 32. When the scanner 300 is driven, first and second traveling bodies 33 and 34 travel and a light source in the first traveling body 33 emits light. The light is reflected from the surface of the original and directed to the second traveling body 34. A mirror in the second traveling body 34 reflects the light. The reflected light passes through the imaging lens 35 and enters the reading sensor 36 where the content of the original is read.

By pressing the start switch, not shown, one of the support rollers 14, 15, and 16 is rotated by a drive motor, not shown, and the other two support rollers are rotationally driven by the rotating roller to rotate and move the intermediate transfer unit 10. At the same time, photosensitive elements 40 (40K, 40Y, 40M, and 40C) included in respective image forming units 18 are rotated and a single color image in black, yellow, magenta, or cyan is formed thereon. By sequentially transferring the single color images in accordance with the rotation of the intermediate transfer unit 10, a composite color image is formed on the intermediate transfer unit 10.

Furthermore, when the start switch, not shown, is pressed, one of sheet feed rollers 42 that is included in the sheet feed table 200 is selected and rotated so that recording media are fed from one of sheet feed cassettes 44 installed in a sheet bank 43. The recording media are separated at a separation roller 45 one by one and each recording medium enters a feeding path 46 and is guided to a feeding path 48 in the main body 100 by conveyance rollers 47. The recording medium contacts and stops at a registration roller 49.

The registration roller 49 is rotated in accordance with the movement of the composite color image on the intermediate transfer unit 10 and conveys the recording medium to between the intermediate transfer unit 10 and the secondary transfer device 22. The color image is transferred to the recording medium by the secondary transfer device 22.

After image transfer, the recording medium is conveyed to the fixing device 25 by the secondary transfer device 22. In the fixing device 25, the transferred image is fixed upon application of heat and pressure. A switching member 55 is switched to output the recording medium by an output roller 56. The recording medium is stacked on a sheet output tray 57.

Residual toner remaining on the intermediate transfer unit 10 after image transfer is removed by the cleaning device 17 to prepare for next image forming operation by the tandem image forming unit 20.

A primary transfer device 62 is a roller pressed against the photosensitive element 40 with the intermediate transfer unit 10 therebetween. The primary transfer device 62 is not limited to a roller and may be a non-contact corona charger.

As the photosensitive element 40 rotates, a charging device uniformly charges the surface of the photosensitive element 40. The exposure device 21 irradiates the photosensitive element 40 with a laser beam or writing light generated by an LED, and the like, based on the reading by the scanner 300 to form a latent electrostatic image on the photosensitive element 40.

Example embodiments are effectively applied to a color electrophotographic apparatus that uses an intermediate transfer belt as an image carrier unit since it is desirable to move the belt at constant speed to superimpose a plurality of color images one atop another.

As can be understood by those of skill in the art, numerous additional modifications and variations are possible in light of the above teachings. It is therefore to be understood that, within the scope of the appended claims, the disclosure of this patent specification may be practiced otherwise than as specifically described herein.

Further, elements and/or features of different example embodiments may be combined with each other and/or substituted for each other within the scope of this disclosure and appended claims.

Still further, any one of the above-described and other example features of example embodiments may be embodied in the form of an apparatus, method, system, computer program or computer program product. For example, the aforementioned methods may be embodied in the form of a system or device, including, but not limited to, any of the structures for performing the methodology illustrated in the drawings.

Any of the aforementioned methods may be embodied in the form of a program. The program may be stored on a computer-readable medium and adapted to perform any one of the aforementioned methods when run on a computer device (a device including a processor). The program may include computer-executable instructions for carrying out one or more of the operations above, and/or one or more of the aspects of example embodiments. Thus, the storage medium or computer-readable medium, is adapted to store information and is adapted to interact with a data processing facility or computer device to perform the method of any of the above mentioned example embodiments.

The storage medium may be a built-in medium installed inside a computer device main body or a removable medium arranged so that it can be separated from the computer device main body. Examples of the built-in medium include, but are not limited to, rewriteable non-volatile memories, such as ROMs and flash memories, and hard disks. Examples of the removable medium include, but are not limited to, optical storage media such as CD-ROMs and DVDs; magneto-optical storage media, such as MOs; magnetic storage media, including but not limited to floppy disks (trademark), cassette tapes, and removable hard disks; media with a built-in rewriteable non-volatile memory, including but not limited to memory cards; and media with a built-in ROM, including but not limited to ROM cassettes, etc. Furthermore, various information regarding stored images, for example, property information, may be stored in any other form, or provided in other ways.

Example embodiments being thus described, it will be apparent that the same may be varied in many ways. Such variations are not to be regarded as a departure from the spirit and scope of example embodiments, and all such modifications as would be obvious to one skilled in the art are intended to be included within the scope of the following claims.

What is claimed is:

1. A relative position detection device, comprising:
   a scale comprising a continuous pattern formed by changing reflectance or transmittance and configured to move in a direction;
   a light source configured to irradiate the scale;
   a light receiving unit configured to read the pattern and output a signal; and
   a signal processing unit configured to process the output signal of the light receiving unit,
   wherein the scale includes a disk where the lines are radially arranged, the pattern is formed by a line pattern having regularly spaced lines perpendicular to the direction of movement of the scale, the light receiving unit is slanted with respect to the lines at an angle, and the relative position detection device detects a relative position change and speed change of the scale based on the angle.

2. The relative position detection device according to claim 1,
   wherein each line has a fixed width, an area read by the light receiving unit has a width wider than the fixed width of the line, and the relative position change of the scale in the direction perpendicular to the movement of the scale is detected based on limits of movement of the line read by the light receiving unit in the width direction thereof.

3. The relative position detection device according to claim 1,
   wherein the pattern of the scale further comprises a line parallel to the direction of movement of the scale.

4. The relative position detection device according to claim 1, further comprising:
   a computing unit configured to compute an interval between at least two lines read by the light receiving unit for correcting an error in the interval between the lines or compensating for expansion or contraction of the scale.

5. The relative position detection device according to claim 1,
   wherein the light receiving unit comprises a plurality of light receiving units in the direction of movement of the scale.

6. The relative position detection device according to claim 1,
   wherein the light receiving unit comprises a two-dimensional image sensor and the scale is disposed in the two-dimensional direction.

7. The relative position detection device according to claim 1,
   wherein the light receiving unit comprises a light receiving element array.

8. The relative position detection device according to claim 1, further comprising:
   a signal processor configured to output AB-phase pulse signals with a phase difference of an electrical angle of 90 degrees therebetween.

9. The relative position detection device according to claim 1, further comprising:
   a lens unit disposed between the light source and the light receiving unit and configured to produce an image of the scale on a light receiving area of the light receiving unit.

10. An image forming apparatus comprising the relative position detection device according to claim 1.

11. A detector for a rotary body, comprising:
    a relative position detection device including
        a scale including a continuous pattern formed by changing reflectance or transmittance and configured to move in a direction,
        a light source configured to irradiate the scale,
        a light receiving unit configured to read the pattern and output a signal, and
        a signal processing unit configured to process the output signal of the light receiving unit;
    a drive unit configured to drive the rotary body; and
    a control unit configured to control the drive unit based on a position change and speed change of the rotary body detected by the relative position detection device,
    wherein the pattern is formed by a line pattern having regularly spaced lines perpendicular to the direction of movement of the scale, the light receiving unit is slanted with respect to the lines at an angle, and the relative position detection device detects a relative position change and speed change of the scale based on the angle.

12. The detector for the rotary body according to claim 11, further comprising:
    a thrust direction control unit configured to control a position of the rotary body in a thrust direction perpendicular to a direction of rotation of the rotary body,
    wherein the control unit controls the drive unit and the thrust direction control unit.

* * * * *